July 12, 1966

J. L. CHIDDISTER ETAL 3,260,354

CONVEYOR APPARATUS

Filed May 15, 1964

INVENTORS
Jerry L. Chiddister &
BY David R. Snoeyenbos

W. F. Wagner
ATTORNEY

United States Patent Office 3,260,354
Patented July 12, 1966

3,260,354
CONVEYOR APPARATUS
Jerry L. Chiddister, Warren, Mich., and David R. Snoeyenbos, Santa Barbara, Calif., assignors to General Motors Corporation, Detroit, Mich., a corporation of Delaware
Filed May 15, 1964, Ser. No. 367,679
3 Claims. (Cl. 198—184)

This invention relates to conveyor apparatus and more particularly to conveyors of the type in which an endless belt is entrained over a plurality of rollers and the portions of the belt therebetween are arranged in proximate relation to low unit loading air bearings.

As used herein, the expression "low unit loading air bearing" is intended to denote bearings of the type in which superatmospheric air at relatively low pressure is distributed over an effective support area substantially equal to the plan form area of the support on which the load is imposed.

The invention is described hereinafter is intended for and adaptable to utilization in a wide variety of conveyor applications wherein the prime moving element is an endless flexible belt. Among the applications contemplated are continuous unidirectional and bidirectional industrial conveyor belts, moving "sidewalks," and "sandwich" conveyor arrangements adapted to impart positive tractive effort to strip material.

According to the general features of the invention, an endless belt of suitable flexible material is entrained over a plurality of rollers oriented in geometric relationships which serve to establish the direction of movement of the belt and maintain it in proper tension. Extending between adjacent pairs of the rollers in surface proximate relation to the free portions of the belt are low unit loading linear air bearings, which frictionlessly support the free portions of the belt and any load carried thereon, thus not only eliminating the need for the large numbers of idler rollers conventionally employed in similar belt conveyors, but additionally enabling greatly increased loads to be sustained and transported thereon.

An object of the present invention is to provide improved conveyor apparatus.

A further object is to provide conveyor apparatus of simplified construction and improved load carrying capacity.

A still further object is to provide belt conveyor apparatus in which the power requirements necessary to overcome inherent friction is substantially reduced.

A yet further object is to provide conveyor apparatus utilizing low unit loading air bearing support means extending over substantially the entire useable working area of the endless belt.

Still a further object is to provide apparatus of the stated character wherein the air bearing support means is constructed and arranged so as to provide exceptionally high load supporting capability in relation to the power consumer in providing air energization thereof.

Still another object is to provide apparatus of the type described wherein the air bearing means establishes a uniform pressure effective support area extending over the entire surface of the adjacent portion of the endless belt.

Yet a further object is to provide apparatus of the type described which is arranged in sandwich relation relative to strip material wherein the air bearing means are selectively energizable so as to enable either continuous or intermittent linear feeding of such material.

These and other objects, advantages and features of the invention will become more fully apparent as reference is had to the accompanying specification and drawing wherein.

Figure 1:
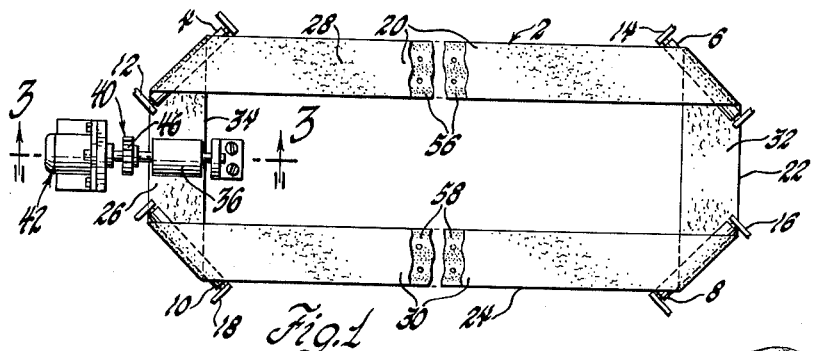
FIGURE 1 is a schematic view of a bidirectional endless belt conveyor constructed in accordance with the invention.

Referring now to the drawing and particularly FIGURE 1, there is shown a conveyor apparatus in which the reference numeral 2 generally designates an endless flexible belt which is entrained over a plurality of guide rollers 4, 6, 8 and 10. Rollers 4, 6, 8 and 10 are rotatably mounted on support brackets 12, 14, 16 and 18, each of which are rigidly secured on a suitable fixed support, not shown. Rollers 4, 6, 8 and 10 are angularly oriented in a common horizontal plane for rotation about axes set at 45° angles to a rectangle defined by the side edges 20, 22, 24 and 26 of belt 2. Belt 2 is entrained over rollers 4, 6, 8 and 10 in an over and under relationship so that the free longitudinal portions 28 and 30 thereof form load supporting and conveying surfaces which move continuously in parallel opposite directions. The shorter portions 32 and 34 are entrained in a plane beneath the rollers, and portion 34 passes between opposed friction rollers 36 and 38 of a power drive mechanism 40.

Figure 3:
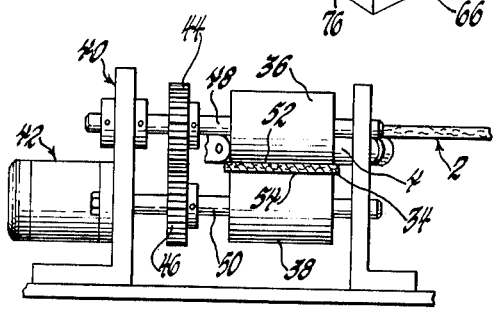
FIGURE 3 is an enlarged view looking in the direction of arrows 3—3 of FIGURE 1.

As seen best in FIGURE 3, the power drive mechanism 40 comprises electric motor driven reduction gear mechanism 42 which in turn drives a pair of meshed gears 44 and 46 mounted in driving engagement with the spindles 48 and 50 upon which friction rollers 36 and 38 are also secured. It will be evident that upon operation of the motor driven reduction gear mechanism 42, rollers 36 and 38 will tractively propel belt 2 through frictional engagement with the upper and lower surfaces 52 and 54 thereof causing linear movement of portion 34 and thereby in turn causing continuous entrained movement of belt 2 in the recirculating path defined by the rollers.

In order to support the substantial expanse of portions 28 and 30 of belt 2 in accordance with the invention, a pair of spaced apart low unit loading air bearing assemblies 56 and 58 are disposed in parallel relation beneath portions 28 and 30, respectively. Bearing assemblies 56 and 58 extend continuously between rollers 4 and 6 and rollers 8 and 10, respectively. Inasmuch as the construction and arrangement of bearings 56 and 58 are identical to that of corresponding bearing 60 in the embodiment shown in FIGURE 2, it will be understood that the description of bearing assembly 60 applies equally to bearings 56 and 58.

As seen best in FIGURE 2, the bearing assembly 60 disposed below portion 62 of belt 64 comprises a rectangular longitudinally extending rigid duct 66 which includes a horizontal lower wall portion 68, parallel upturned side walls 70 and 72 and a center partition 74 extending longitudinally midway between side walls 70 and 72. Disposed between the lower surface of belt 64 and duct 66 is a longitudinally extending flexible membrane 76 which is preferably preformed to a cross-sectional configuration establishing an inverted delta-shaped longitudinally extending plenum cavity 78 beneath belt 64. The side margins 80 and 82 of membrane 76 are hermetically secured to the upper edges of side walls 70 and 72, respectively, while the central portion of the membrane is similarly hermetically attached to the partition 74. At its opposite extremities, duct 66 includes upturned end walls 84 and 86 to which the end margins 88 and 90 of membrane 76 are hermetically attached so that the duct and membrane form a pair of linearly extending chambers 92 and 94. In the illustrated embodiment, the end wall 86 is fitted with an air supply conduit 96 which communicates with a source of air pressure, not shown. In operation, air enters chamber 92 through conduit 96 and passes therefrom through the plurality of longitudinally spaced apertures 98 in membrane 76 into the cavity 78 and thence into chamber 94 through the plurality of longitudinally spaced apertures 100 formed in membrane 76 at the opposite side of partition 74. When both chambers 92 and 94 and cavity 78 are thus subjected to super-atmospheric air pressure, the membrane automatically assumes the delta configuration and the air within cavity 78 forms a low pressure air cushion which supports the belt portion 64 in frictionless relation with bearing 60. Inasmuch as air pressure within cavity 78 and chambers 92 and 94 is in excess of atmospheric pressure, continual leakage or loss of air occurs by radial discharge through minute longitudinally extending vertical gaps 102 and 104 occurring between the lower surface of the belt and the uppermost limit of the membrane convolutions 106 and 108. Gaps 102 and 104 are maintained automatically at a relatively shallow dimension due to the fact that air escapes through the gaps at relatively high velocity and hence low pressure, while the pressure within chambers 92 and 94 seeks to urge the membrane convolutions into close proximity with the lower surface of belt 2. In consequence, if the gaps 102 and 104 are diminished by increasing load on the belt portion 62, the rate of lateral discharge is choked sufficiently to cause an increase in pressure in cavity 78 which tends to displace the belt portion 62 upwardly and restore the proper gap dimension. Conversely, if the loading on belt 64 is diminished, the tendency of the belt portion 62 to lift upwardly away from the membrane 76 and increase the throttling gap dimension results in more rapid loss of air and an attendant reduction in the pressure of air within cavity 78 which results in lowering of the level of the belt portion 62 to re-establish the normal throttling gaps 102 and 104. It will, therefore, be seen that air bearing 60 incorporates what may be termed a self-modulation flexible choke which automatically controls the vertical dimension of throttling gaps 102 and 104 so as the maintain a maximum effective support area of minimum unit loading. Because of the extremely low unit loading, maintenance of very low air pressure in cavity 78 enables belt portion 64 to support unusually large loads in friction free relation with bearing 60. By way of example, if belt portion 62 is 10 feet long between the rollers and 1 foot wide between the throttling gaps 102 and 104, an effective support area of 10 square feet or 1440 square feet exists. Therefore, if the cavity 78 and chambers 92 and 94 are subjected to a constant pressure of for example 5 p.s.i., a load of 7200 lbs. may be imposed on the belt without inducing frictional drag.

Figure 2:
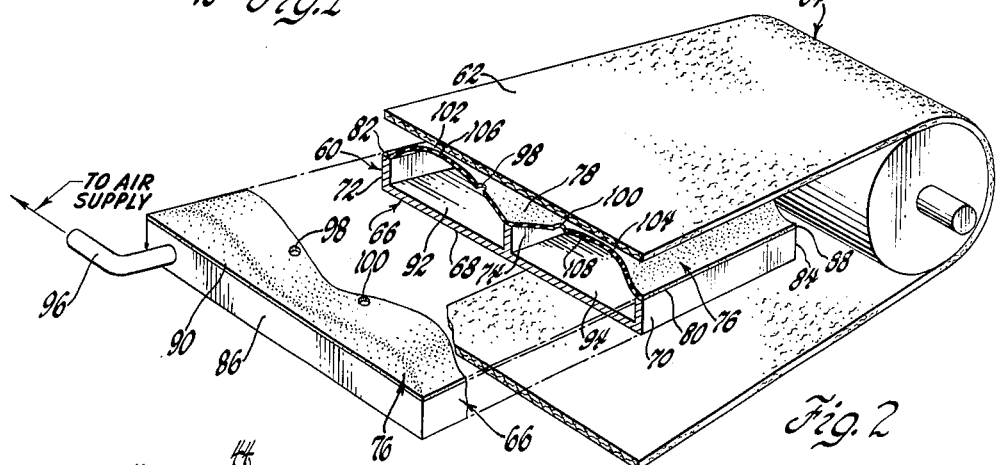
FIGURE 2 is a perspective view, partly in section, of a unidirectional conveyor apparatus in accordance with the invention.
Figure 4:
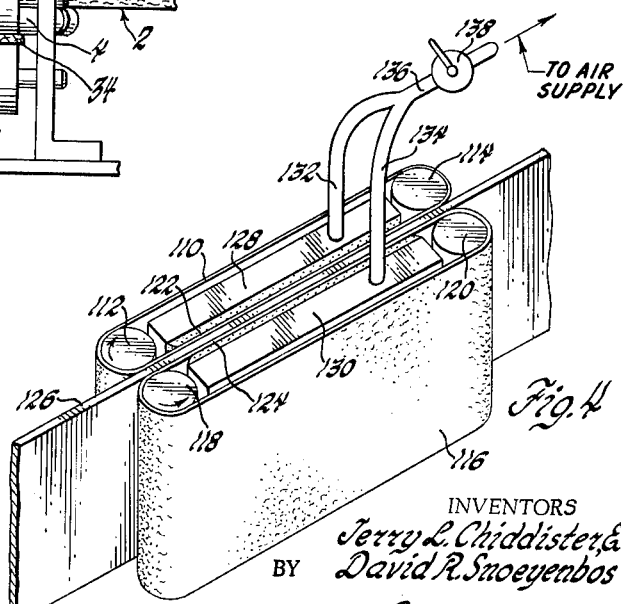
FIGURE 4 is a perspective view of a modified form of the invention.

In FIGURE 4, there is shown a modification of the invention wherein paired apparatus similar to that shown in FIGURE 2 is disposed in "sandwich" relation at opposite sides of sheet material intended for linear translation on a continuous or intermittent basis. In the schematic form illustrated, a first endless belt 110 is entrained over a drive roller 112 and an idler roller 114, while the second endless belt 116 is entrained over a drive roller 118 and idler roller 120 so that the adjacent intermediate portions 122 and 124 of belts 110 and 116 are disposed in parallel spaced apart relation from each other. Preferably, the respective pairs of rollers 112–114 and 118–120 are mounted on a suitable support, not shown, in a manner enabling adjustment of the lateral space between the belt portions 122 and 124 to accommodate various thicknesses of sheet material 126. Also mounted on the support, not shown, and extending upwardly between the rollers 112–114 and 118–120 are bearing assemblies 128 and 130 which are identical in structure to that described with reference to FIGURE 2, so that the belt portions 122 and 124 may be subjected to a low unit loading air cushion which will urge tde portions 122 and 124 into frictional engagement with the opposite sides of material 126. In order to enable either intermittent or continuous frictional driving engagement between the respective belts and the material 126, air supply conduits 132 and 134 communicating with the bearings 128 and 130 are arranged in parallel relation with a main air supply conduit 136 having a control valve 138 disposed therein. In operation, bearings 128 and 130 are selectively energized by manipulation of valve 138 so that the cushion pressure against the intermediate portions 122 and 124 of the belt may be maintained either on a continuous basis or intermittently on a clutching-declutching basis. It will be understood that drive rollers 112 and 118 are contra-rotationally driven continuously by suitable motor means, not shown.

While several embodiments of the invention have been shown and described, it will be apparent that other changes and modifications may be made therein. It is, therefore, to be understood that it is not intended to limit the invention to the embodiments shown, but only by the scope of the claims which follow.

We claim:

1. Conveyor apparatus comprising an endless belt entrained over spaced rollers, power means for driving said belt along a path defined by said rollers, low unit loading air bearing means extending between said rollers in surface proximate relation to said belt, said bearing means including an elongated rigid pressurized duct and an elongated strip of flexible material hermetically attached along its side and end margins to said duct, means attaching the mid portion of said flexible material to said duct along a path spaced midway between said side margins, and means forming longitudinally spaced apertures in said flexible material laterally adjacent the path of attachment of said mid portion.

2. Conveyor apparatus comprising an endless belt entrained over spaced rollers, power means for driving said belt along a path defined by said rollers, low unit loading air bearing means extending between said rollers in surface proximate relation to said belt, said bearing means including an elongated rigid pressurized duct open on the side facing said belt and an elongated strip of flexible material hermetically attached along its side and end margins to said duct, means attaching the mid portion of said flexible material to said duct along a path spaced midway between said side margins, and means forming longitudinally spaced apertures in said flexible material laterally adjacent the path of attachment of said mid portion.

3. Conveyor apparatus comprising an endless belt entrained over spaced rollers mounted on a fixed support, power means for driving said belt along a path defined by said rollers, and superatmospheric pressure energized low unit loading air bearing means mounted on said support extending between said rollers, said air bearing means including flexible material arranged in surface proximate relation to said belt which forms a longitudinally extending cavity of inverted delta cross section when said bearing is subjected to superatmospheric air pressure.

References Cited by the Examiner

UNITED STATES PATENTS

| | | | |
|---|---|---|---|
| 478,502 | 7/1892 | Corning | 198—184 X |
| 756,600 | 4/1904 | Dodge | 198—184 X |
| 2,553,964 | 5/1951 | Eggleston | 198—203 |
| 2,658,606 | 11/1953 | Bankauf | 198—184 |
| 2,659,476 | 11/1953 | Koerber | 198—184 |
| 2,863,555 | 12/1958 | Jaritz | 198—203 |
| 3,198,499 | 8/1965 | Stanley | 226—97 X |

FOREIGN PATENTS

| | | |
|---|---|---|
| 641,885 | 8/1950 | Great Britain. |
| 1,166,086 | 3/1964 | Germany. |

EVON C. BLUNK, *Primary Examiner.*

EDWARD A. SROKA, *Examiner.*